Dec. 16, 1930.   R. R. SEARLES   1,785,654
ANTIFRICTION SPRING CONNECTION
Filed Jan. 29, 1925
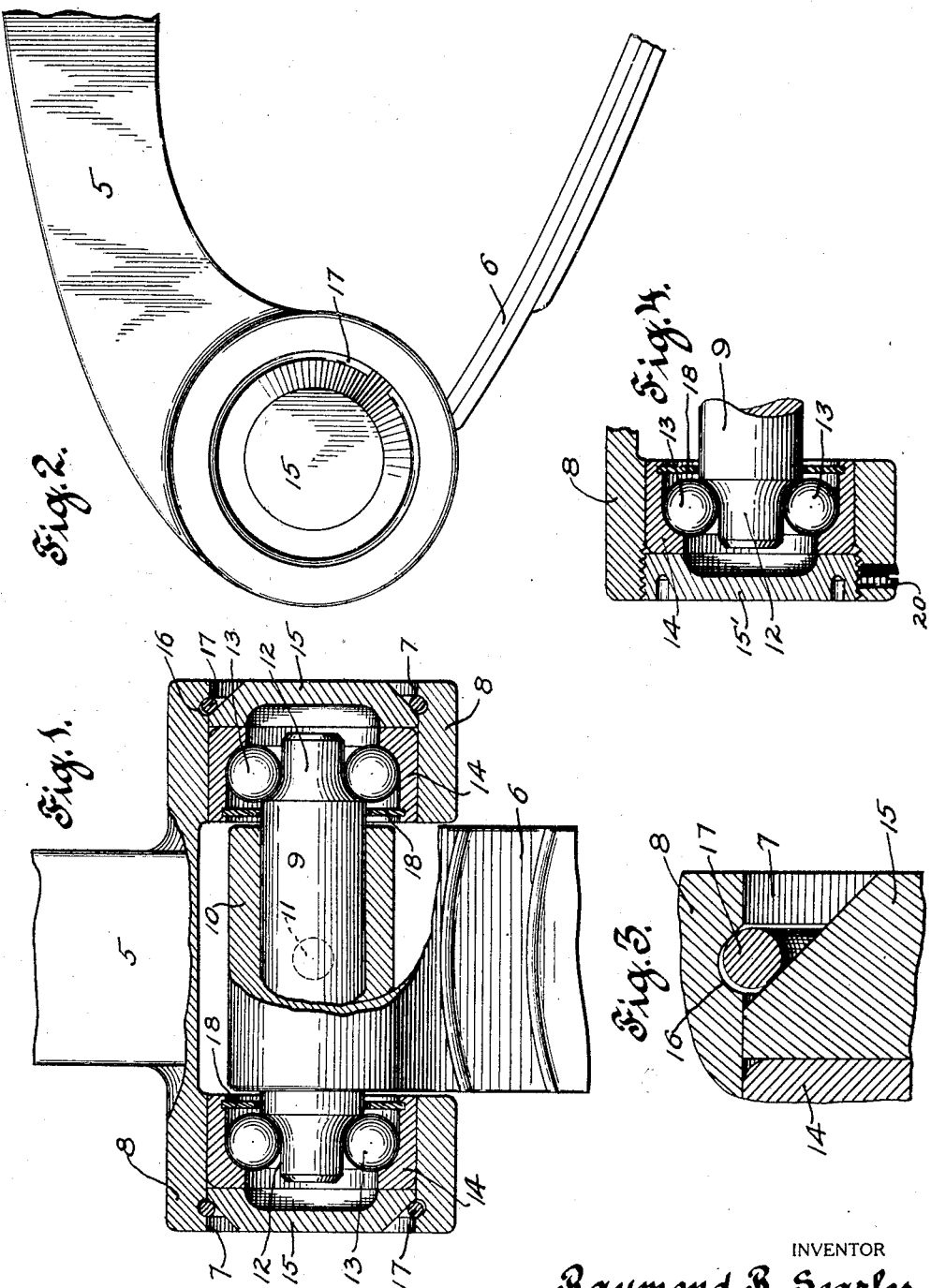
INVENTOR
Raymond R. Searles
BY
Mitchell Brothers
ATTORNEYS Patented Dec. 16, 1930

1,785,654

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

ANTIFRICTION SPRING CONNECTION

Application filed January 29, 1925. Serial No. 5,624.

My invention relates to a spring end connection whereby a vehicle spring is connected to the vehicle frame or the like.

It is the principal object of the invention to provide a simple, sturdy form of anti-friction spring end connection which will be cheap to manufacture and easy to assemble. Other minor objects will be apparent as the specification proceeds.

In the drawings which show for illustrative purposes only, preferred forms of the invention:

Fig. 1 is a fragmentary end view of a spring end and vehicle frame and showing one form of spring end connection in central section.

Fig. 2 is a view in side elevation of parts shown in Fig. 1.

Fig. 3 is an enlarged fragmentary view of a detail.

Fig. 4 is a fragmentary view showing a slightly modified form.

In said drawings 5 indicates a portion of a vehicle frame, while 6 designates a portion of a vehicle spring which is connected to the frame by means of the improved spring end connection to be described. In the preferred form the frame is provided with recesses, bores or seats 7—7, formed in bosses 8—8, on the sides of the frame 5. A pin or journal 9 is secured in the spring eye 10 in any suitable manner as by shrinking or other means such as a pin 11. The ends of this pin project laterally from the sides of the spring eye and extend into the recesses 7—7 in the frame bosses. In the specific illustration the ends of the pin are reduced in section as indicated at 12 for the purpose of forming seats for anti-friction members such as balls 13—13. While it is not in all cases necessary to form the seats or raceways 12—12 directly upon the pin ends, this form of construction is cheap to manufacture and serviceable in use. In order to provide seats for the anti-friction members 13—13 complementary to the seats 12—12 there are preferably provided anti-friction race rings or bearing cups 14—14 seated in the recesses 7—7. It will be seen that the bearing surfaces on the race rings 14 and on the pin ends 12—12 form in effect an angular contact bearing so that both radial and end thrusts are taken by the balls.

The outer ends of the recesses 7—7 are closed by suitable means such as end caps 15—15 which in the form shown abut the outer ends of the race rings 14—14 and serve to hold the latter in proper position of adjustment in the recesses. As shown more particularly in Fig. 3, each recess 7 may have an annular internal groove 16 therein which is located outwardly of the inclined face of the end cap 15. A spring retaining ring 17 is slipped into the groove 16 and in expanding into the groove abuts against the end cap 15 and holds the same in place.

The end caps or abutments 15—15 are thus definitely spaced apart a single definite distance in one direction, that is, in a direction against separation. The outer bearing rings 14—14 abutting against the abutments 15—15 are consequently spaced a corresponding distance apart. The inner raceways 12—12 in this case, upon a unitary pin are spaced a single definite distance apart. Therefore, when the parts are assembled, the antifriction bearing members will fit the seats with the proper degree of tightness and no adjustments are necessary. This construction facilitates assembly.

As a convenient means for retaining lubricant in the space adjacent the bearing members and for excluding dust and water, I preferably provide a closure member or dust ring 18 which may be seated on and be secured to the race rings 14—14. These dust rings may be formed of felt, metal or other suitable material and abut or extend up quite closely to the pins 9. It will thus be seen that a completely enclosed anti-friction bearing is provided at each side of the frame and there is little chance for the escape of lubricant or for the entrance of dust or water and the bearings will run for long periods without the necessity for cleaning or lubrication.

The balls 13—13 serve to support the frame from the spring without, however, any direct connection between these two elements and both radial and thrust loads are taken up by the balls themselves.

In the modification shown in Fig. 4 the construction is substantially the same as that previously described except that each end cap or plug 15' is threaded into the end of the recess 7 in the boss 8 and may be held in an adjusted position by means of a set screw 20 or the like. The construction shown in Fig. 4 permits of adjustment. The operation of the form shown in Fig. 4 is the same as in the previously described form.

While the invention has been described in great detail, I do not wish to be limited to the exact forms shown since changes may be made within the scope of the invention as defined in the appended claims.

I claim:

1. In a spring end connection, a frame part having spaced apart seats for bearing cups, bearing cups in said seats and insertible axially thereof, bearing pin means to be secured to a spring and project beyond the sides thereof, the ends of said pin means extending into said bearing cups and having bearing raceways formed directly thereon, antifriction bearing members interposed between said bearing cups and the ends of said pin means, a lubricant retaining and dust excluding closure ring carried bodily by each bearing cup and extending to and surrounding said projecting ends of said pin means so as to close the annular space between said bearing cups and said pin means extending thereinto, and means for retaining said bearing cups in place in said seats.

2. In a spring end connection, a frame part having spaced apart bosses with aligned bores therein, bearing cups in said bores and insertible axially thereof, bearing pin means to be secured to a spring and project beyond the sides thereof, the ends of said pin means extending into said bearing cups and having bearing raceways formed directly thereon, antifriction bearing members interposed between said bearing cups and the ends of said pin means, a lubricant retaining and dust excluding closure ring carried bodily by each bearing cup and extending to and surrounding said projecting ends of said pin means so as to close the annular space between said bearing cups and said pin means extending thereinto, and threaded plugs screwed into said bores for retaining said bearing cups therein.

RAYMOND R. SEARLES.